July 22, 1958  W. PARTL  2,844,814
SUPERVISORY ELECTRIC SIGNAL APPARATUS, PARTICULARLY
FOR AUTOMOTIVE VEHICLES
Filed Dec. 5, 1956
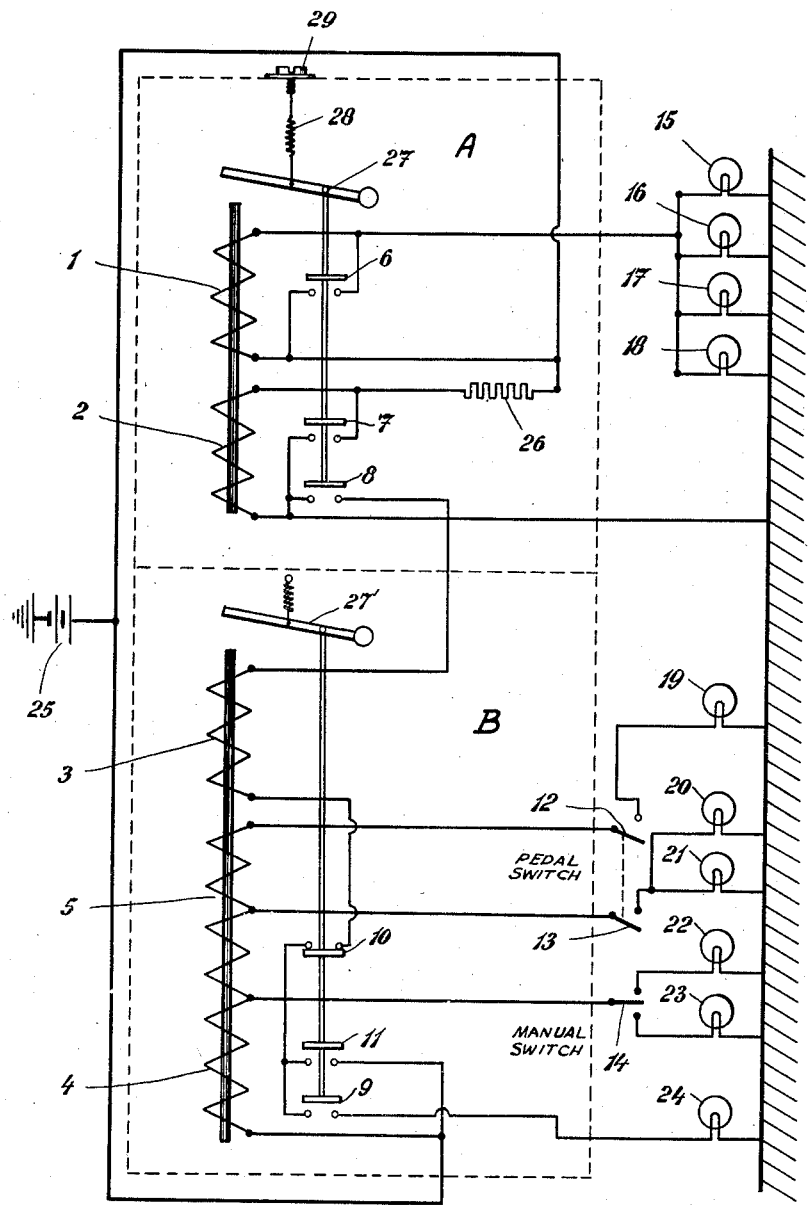
INVENTOR
Wilhelm Partl

United States Patent Office 2,844,814
Patented July 22, 1958

2,844,814

SUPERVISORY ELECTRIC SIGNAL APPARATUS, PARTICULARLY FOR AUTOMOTIVE VEHICLES

Wilhelm Partl, Pullach, near Munich, Germany

Application December 5, 1956, Serial No. 626,487

Claims priority, application Germany February 20, 1956

6 Claims. (Cl. 340—251)

My invention relates to electric signal apparatus for simultaneously supervising a plurality of current-consuming devices of continuous and temporary operations respectively, and for indicating the occurrence of fault acoustically as well as optically. In a more particular aspect, the invention relates to aparatus on automotive vehicles or other conveyances for supervising the respective electric circuits of continuously lighted tail lights, temporarily operating travel-direction indicators and temporarily operating stop lights, and for indicating to the driver any occurrence of trouble in these circuits.

Numerous supervisory devices have become known which have fault responsive relays for indicating trouble in the operation of current consuming devices. For instance, continuously excited relays have been used for the supervision of continuously lighted lamps such as the tail lights of a vehicle, the relays responding to interruption of the lamp circuit and actuating an optical or acoustical indicating means. The supervision of intermittently operating load devices, for instance travel-direction indicators and stop lights, is effected by means of a continuous-current relay so that, for instance, when the direction indicator is switched on, a buzzer is heard to remind the driver to switch off the direction indicator after completing the signalled turn.

It is further known to use supervisory relays with at least two magnet windings opposingly related to each other, one being traversed by constant auxiliary current while the other is connected in the circuit being supervised. As long as the current flowing in the supervised circuit maintains its normal magnitude, the two windings magnetically compensate each other so that the relay does not respond. It has further been proposed to have the windings in such a relay short-circuited by the attraction of the relay armature thus eliminating the magnetic effect and releasing the armature, whereby a continuous alternation between attraction and release, and hence a buzzer sound, occurs as long as the supervised circuit is troubled.

Supervisory apparatus have also been constructed as a combination of two mechanically independent relays of which one supervises the continuously operating load devices and the other the temporarily operating devices such as direction indicator and stop light, the relay for the continuously operating devices being magnetically compensated as described above, whereas the relay for the intermittent devices is a normal relay which has a number of magnet windings corresponding to the number of the circuits to be supervised. Both relays are designed to produce a buzzer sound when responding. By means of particular circuit connections it is also possible to augment the acoustic signal by having both relays operate as buzzers when only one of them responds to trouble. This apparatus has been provided with an indicating lamp which flickers when either relay responds.

The above-mentioned two-relay apparatus, however, have a deficiency which limit their applicability, particularly on modern automotive vehicles. As long as the apparatus has merely the purpose of supervising an electric circuit with only one current-consuming load, such as a stop light with a single lamp, the operation is satisfactory. Under such conditions, only two sources of trouble can occur in practice, namely a short-circuit in the supervised circuit which causes excessive current flow and blowing of the fuse, and the more frequently occurring defect of having the normal current, for instance 0.75 amp., reduced to zero by circuit interruption. The latter defect occurs when the lamp burns out or drops out of its socket, or when a wire connection becomes loose. With such large changes in current, that is from the normal value down to zero, it is of course not difficult to adjust the relay for reliable response. Nowadays, however, a single tail lamp is hardly ever used, at least two or four such lamps being normally provided. Hence, it may happen that only one lamp will fail so that the rated current drops only a given percentage rather than down to zero. The reduction in current is 50% if two tail lamps are provided of which only one may fail. If the tail light circuit comprises four lamps in parallel, failure of only one of them reduces the current by only 25% so that, for instance, if each lamp consumes a current of 0.75 amp., the rated total current of 3 amps. will drop only to 2.25 amps. It is obvious that in such a case the response of the relay is not by far as reliable as when the current decreases from 0.75 amp. to zero.

An obvious expedient for coping with such conditions would be to simply reduce the spring tension of the relay armature to such an extent that when the normal current drops 25% the resulting magnetic force imposed upon the armature will suffice to actuate the armature. Indeed, this can be done in stationary plants where the relay has a fixed and shock-free mounting. On automotive vehicles and other conveyances, however, the occurrence of vibrations and shocks is inevitable so that the armature is subjected to impact forces which may move it into the responded position. Experience has shown that such undesired response cannot be sufficiently prevented by most careful mounting of the relay in sponge or foam rubber.

It is the main object of the present invention to obviate the above-described deficiency.

To this end, and in accordance with my invention, I provide in apparatus for remote indication of trouble in circuits with two or more parallel connected load devices, a supervisory relay which has a plurality of mutually differential magnet windings of which one or more are short-circuited by response of the armature, and I give these windings respectively different ampere turns to effect an only partial magnetic compensation so related to the spring tension of the armature that, under normal operating conditions, the force required for attracting the armature is larger than the magnetic biasing force resulting from the partial compensation but is smaller than the magnetic force acting upon the armature when the current supply drops to given minimum percentage, for instance 25%.

It has been ascertained that, by thus dimensioning the ampere-turn ratio of the relay differential windings relative to the spring tension in apparatus of the above-mentioned type, a reliable response of the relay is secured despite the fact that under such conditions the mechanical mounting of the armature is relatively rigid. Due to this rigidity of the armature mounting or spring force, the armature does not respond to mechanical impacts of normally expectable intensty. On the other hand, because of the under-compensation or partial compensation of the magnetomotive forces in the iron core, the magnetic force due to occurrence of a current reduction, for instance of 25% corresponding to the failure of one lamp out of four parallel connected lamps, increases to such a magnitude that the stiffly sprung armature is safely attracted thus securing, even under adverse mechanical conditions, the signalling operations described below with reference to the illustrated example. It is obvious that the relay operating conditions are more favorable with a smaller number of lamps connected in parallel because then the change in current due to failure of only one lamp is larger. With three lamps, failure of one results in current decrease of 33⅓%, whereas with only two lamps the current is reduced to 50%.

Before dealing with further details of the invention, it will be helpful to first consider the most important objectives to be satisfied by apparatus of the type with which the invention concerns itself. For simplicity, it will be assumed that the apparatus is used on an automotive vehicle equipped with continuously lighted tail lights, intermittently operating direction indicator means, and one or more stop lights. It is further assumed that there are several tail lights, stop lights and the like, the lamps of each being parallel connected in a common electric circuit. In such a system, the following operating conditions may occur:

(1) Tail lights are lighted,
(2) Direction indicator in operation,
(3) Stop lights are lighted,
(4) Tail lights and direction indicator simultaneously in operation,
(5) Tail lights, direction indicator and stop lights simultaneously in operation,
(6) Direction indicator and stop lights in operation,
(7) Tail lights and stop lights in operation.

In any of these operating conditions the supervisory apparatus is supposed to reliably respond to trouble. It has been found preferable in practice that relative to the load devices, i. e. the tail lights, that are continuously in operation the apparatus should respond only in the event of trouble, that is when one or both lamps burn out. However, relative to the temporarily operated load devices, namely the direction indicator and stop light, it has been found preferable if the supervisory apparatus responds whenever these particular devices are switched on. That is, a buzzer sound is to occur as long as the direction indicator is in operation. When the driver steps on the brake pedal so that the stop light is switched on, there occurs an acoustic signal, namely a single knocking sound, caused by the attraction of the armature in the relay, and also a continuous lighting of the signal lamp. When two stop lamps are provided and one of them drops out, the apparatus will issue a buzzing sound and the control lamp will flicker because the current normally flowing through the relay windings when both stop lamps are lighted is reduced as soon as one of them drops out so that the relay operating conditions become labile.

The above-mentioned objects, advantages, features and desired operation will be more fully understood from the electric circuit diagram of a supervisory apparatus according to the invention illustrated on the drawing by way of example, the illustrated embodiment being in accordance with equipment now being used in practice.

The illustrated apparatus comprises essentially a checking relay A and a signal relay B preferably both mounted in a common housing. The checking relay A has two windings 1 and 2 on a common iron core. The two windings are poled that, when the current consumption of the four tail lamps 15, 16, 17 and 18 is normal, the two magnetomotive forces (ampere turns) of the respective windings are opposed to each other as is indicated by respective arrows 1a and 2a. According to the invention, the number of turns of the two windings 1 and 2 is so dimensioned that with normal current load, that is when all tail lamps 15, 16, 17, 18 are in working order, the two differential magnetomotive forces (ampere turns) do not fully compensate each other so that a certain magnetic bias is effective upon the armature 27 of the relay. This magnetic bias is so rated with respect to the mechanical biasing force of the armature spring 28, that when the current flowing through winding 1 is reduced by failure of any one of lamps 15, 16, 17 and 18, the current drop is sufficient to produce in the iron core a magnetic field which moves the armature 27 against the force of spring 28 into responsive position.

The movable contact pieces of the respective relay contacts 6, 7 and 8 are mounted on the armature 27 and are insulated from the armature and from one another. The winding 1, as illustrated, is series connected in the circuit of the tail lamps 15, 16, 17 and 18. While four such tail lamps are shown, the illustrated system is analogously applicable with any other number of tail lamps. The contacts 6 are connected across the winding 1 and are normally open. The winding 2 receives constant current through an auxiliary resistor 26. This constant current is so rated, for a given number of turns of winding 2, that under normal operating conditions the above-described resulting magnetic force (magnetic bias) is effective upon the armature 27. Of course, the magnitude of the magnetic bias field may also be adjusted in any other suitable manner, for instance by means of tap connections on winding 2, or by means of an adjustable shunt resistor connected parallel to winding 2. The contact 7, normally open, is connected in parallel to winding 2. Contact 8 is likewise normally open. Resistor 26 may consist of a separate component or it may be mounted as a bifilar winding on the iron core of relay A.

Relay B has three windings 3, 5 and 4 all cumulatively poled. The end of winding 5 is connected with the beginning of winding 4. Relay B has three contacts 9, 11 and 10 which are insulated from each other and mounted on the armature 27' of relay B which corresponds to the armature described above with reference to relay A. Contacts 9 and 11 are normally open. Contact 10 is normally closed. Contact 11 is connected in parallel to winding 4. Contact 9 is series connected in the supply lead of signal lamp 24 whose other pole is connected to the vehicle mass. The starting terminal of winding 5 is connected to the stop light 19 through an automatic switch 12 controlled by the brake pedal. The diagram shows a second automatic switch 13 also connected with the brake pedal. The movable contact of switch 13 is connected to a tap of winding 5, whereas the stationary contact is connected with one pole of two parallel-connected incandescent lamps 20 and 21. In practice, only one brake-pedal switch is provided which has its movable contact connected with the upper end of winding 5 if only one lamp circuit is used for the stop light, whereas the movable brake-switch contact is to be connected to the tap of winding 5 if the vehicle is equipped with two stop light circuits. The reason for this expedient is the fact that when using two parallel connected stop light circuits the total current flowing may be twice as large as with only one circuit. Consequently, in order to produce with two circuits the same magnetomotive force in the relay core, only one half of the number of ampere turns is required. The junction point between windings 4 and 5 is connected with the movable contact of a reversing switch 14 for the travel direction indicator so that by selective actuation of switch 14 either the left or the right direction indicator 22 and 23 can be switched on.

As long as the tail lights are in normal working order, the A-relay is at rest; that is, the armature 27 is dropped off and the contacts 6, 7, 8 are all open. This also applies to the B-relay in which likewise the armature is dropped off so that contacts 9, 11 are open and contact pair 10 is closed. Consequently, the circuit of the signal lamp 24 is open and the lamp is not lit.

Assume that the circuit of tail lights 15 to 18 is interrupted due to burning out of one or several of these lamps. In this case the magnetic effect of winding 1 in the A-relay decreases so that the magnetic force acting upon armature 27 increases. The armature 27 is attracted and closes the three contacts 6, 7 and 8. In this condition, the current supplied from the battery 25 passes through winding 4, contacts 10, winding 3 and closed contact 11 to vehicle mass. Under the effect of the two energized windings 4 and 3, the B-relay also picks up thus closing the circuit of signal lamp 24. The current from battery 25 flows through closed contacts 11 and 9 to signal lamp 24 and thence through the vehicle mass back to the battery. Consequently, control lamp 24 will be lit. However, this will last only momentarily because the A-relay as well as the B-relay will immediately drop off again. The reason for this operation is as follows. In the A-relay, contact 6 short-circuits the winding 1, and contact 7 short-circuits the winding 2. This eliminates the magnetic effect in the iron core, so that armature 27 is released and drops off under the effect of its biasing spring 28. As a result, contacts 6, 7 and 8 open, and the magnetic effect of winding 2 can again commence, whereby the armature is again attracted, and so forth. That is, the armature of relay A performs oscillations and issues a buzzer sound.

A similar effect occurs in relay B. When this relay picks up, its winding 4 is shorted by contact 11 so that the magnetic effect is eliminated; the current through winding 3 is likewise interrupted by the opening of normally-closed contact 10. Due to complete elimination of the magnetic effects, the armature of the relay B is released, and the play repeats itself.

Consequently, when trouble occurs in the circuit of the tail lights 15 to 18, both relays are caused to oscillate and to issue an acoustic signal. Since contact 9 is opened and closed at the same frequency, the signal lamp 24, controlled by contact 9 will flicker at the oscillating frequency of the armatures. As soon as the trouble in the tail-light circuit is eliminated, the normal relay conditions are reestablished so that both relays become inactive and the signal lamp 24 is extinguished.

Now assume that the stop light is switched on by actuation of the brake-pedal switch 12/13. The current for the stop light flows from battery 25 through windings 4 and 5, switch 12/13, stop light 19 and stop lights 20, 21 to the vehicle mass and thence back to the battery. Under control by windings 4 and 5, relay B picks up, thus closing contacts 9, 11 and opening contact 10. The opening of contact 10 has no effect because relay A is in normal condition and contact 8 is open. Due to the closing of contacts 9 and 11 the signal lamp 24 receives current directly from battery 25 through contacts 11 and 9. Although by response of relay B and the closing of its contact 11 the winding 4 is placed out of action, the current flowing through winding 5 from stop lights 19, 21 suffices to keep the armature attracted so that, as long as the brake pedal is being depressed and the stop light is on, the signal lamp 24 will be lighted continuously. An advantage of the apparatus is the fact that when the stop light is being switched on, the armature of the B-relay is attracted by the cumulative magnetic forces of windings 4 and 5, thus reliably providing the force required for moving the armature, whereas subsequently the force produced by winding 5 is alone sufficient for maintaining the armature picked up.

Now to be considered is the case that one of the direction indicators 22, 23 (for instance indicator lamp 22) is switched on by actuation of switch 14. Current flows from battery 25 through winding 4, switch 14, direction indicator 22 and back to the battery. Of the three B-relay windings, only winding 4 is now active; and this winding is so rated that when it is traversed by current flowing through the direction indicator, the resulting magnetic force suffices for attracting the armature. This has the effect of closing contacts 9, 11 and opening contact 10. Contact 10, however, has no effect upon the operation of relay A just as in the above-mentioned case of stop-light actuation. The closing of contact 9 supplies current to the signal lamp 24. Since, however, the contact 11 short-circuits the only current-traversed winding, the armature must again drop off, whereby the contacts 9 and 11 are opened, and the same cycle of operations is repeated. As a result, when actuating any one of the direction indicators, relay B will buzz and the signal lamp 24 will flicker. In this manner, the driver, after completing a turn, is reminded by buzzing and flicker light to re-set the direction indicator if necessary.

Now consider the case, most frequently occurring in practice, that direction indicator and stop light are actuated simultaneously. As a rule, this occurs as follows. The driver intends to make a right turn, for instance. Before commencing the turn he actuates the right-hand direction indicator as he approaches the intersection. As a rule, the driver will also actuate the brake shortly prior to turning in order to reduce the vehicle speed. While making the turn, the brake pedal is again released and the driver, in most cases, may again accelerate the vehicle. During this sequence of operations the signal apparatus responds as follows.

As soon as the direction indicator 22 is switched on, the apparatus buzzes and signal lamp 24 flickers just as described in the second preceding paragraph. When the driver now steps upon the brake pedal, thus lighting through switch 12/14 the stop lights, the winding 5 is energized by the stop-light current and additionally magnetizes the core of relay B. The short-circuiting of winding 4 by contact 11 reduces the magnetic effect, but the magnetic force produced by winding 5 is sufficient for keeping the armature attracted. The buzzing stops and the flicker light of signal lamp 24 turns into continuous light. This condition continues just as long as the brake pedal is being kept depressed by the driver. As soon as the brake pedal is released, thus extinguishing the stop light, the effect of winding 5 also ceases, and the buzzing of the relay, as well as the flickering of the signal lamp 24, again commences. The fact that during braking with simultaneously actuated direction indicator, the buzzing sound is stopped is important in city traffic where it is often necessary to wait a few minutes ahead of an intersection before a turn can be made. A buzzing sound lasting several minutes would be a nuisance to driver or passengers; but, as described, by actuating the brake pedal during any such waiting period, the buzzing is stopped. It should be remembered that it is virtually always necessary and good driving habit to step upon the brake pedal during such waiting periods, so that the supervising apparatus does not require any particular attention or activity from the driver.

Independently of the B-relay operation when actuating the stop light or direction indicator, the A-relay, of course, may also be placed in operation by occurrence of trouble in a circuit of the tail lights 15 to 18.

It is important that at least the movable contact pieces of contacts 6 and 7 in relay A are mounted on a common armature. The magnetic partial compensation of the two windings 1 and 2 is rated for continuous current. Since, at the moment when the tail lights 15 to 18 are switched on, a multiple current flows through winding 1, no compensation is effective so that the relay responds. Due to the fact that both contacts 6 and 7 are closed thus deenergizing the windings, the armature can return to its dropped-off position in which it then remains because the correct current magnitude (determined by the amount of compensation) has adjusted itself in the meantime in winding 1. The use of a common armature has the further advantage that mechanical vibrations, inevitable on a vehicle, are equally effective upon both contact pairs so that the normal condition is not changed by a single closing of contacts 6 and 7 due to jarring.

It has been found preferable in practice to make the position of the armature 27 or the tension of spring 28 (in both relays) adjustable from the outside in order to permit changing the sensitivity of response within certain limits. For this purpose, an adjusting screw 29 is used in the illustrated example. Such adjustability is desirable because, in practice, there are certain differences in current consumption of the respective incandescent lamps, even if lamps of the same rated wattage are used, and such differences can readily be compensated by adjusting the armature setting.

It will be obvious to those skilled in the art, upon a study of this disclosure, that apparatus according to my invention can be modified in various respects and that, therefore, the invention may be embodied in apparatus other than specifically illustrated and described herein, without departing from the essential features of the invention and within the scope of the claims annexed hereto.

I claim:

1. On a vehicle having a plurality of parallel connected electric devices, the combination of a signalling apparatus for indicating to the driver the occurrence of troubled condition of said devices, said signalling apparatus comprising an electromagnetic buzzer relay having mutually opposed magnetizing windings and having spring-biased armature means controlled by said windings, said armature means having respective normally open contacts connected across said windings for short-circuiting them when said armature picks up, a current source, one of said windings being connected to said source and poled for a magnetic-force direction opposed to that of the armature spring bias, a load circuit comprising said parallel-connected load devices and being connected in series with said other winding to said source, said other winding having a smaller number of ampere turns than said one winding whereby said armature is normally subjected to a resultant magnetic force weaker than the spring bias, said magnetic force being larger than said spring bias when the current in said load circuit decreases to a given value below normal.

2. On a vehicle having a plurality of parallel connected electric devices, the combination of a signalling apparatus for indicating to the driver the occurrence of troubled condition of said devices, said signalling apparatus comprising an electromagnetic buzzer relay having mutually opposed magnetizing windings and having spring-biased armature means controlled by said windings, said armature means having respective normally open contacts connected across said windings for short-circuiting them when said armature picks up, a current source, one of said windings being connected to said source and poled for a magnetic-force direction opposed to that of the armature spring bias, a load circuit comprising said parallel-connected load devices and being connected in series with said other winding to said source, said other winding having a smaller number of ampere turns than said one winding whereby said armature is normally subjected to a resultant magnetic force weaker than the spring bias, said magnetic force being larger than said spring bias when the current in said load circuit decreases to a given value below normal due to failure of any one of said devices, a signal lamp, said armature having further contact means connecting said lamp to said source when said armature picks up so as to cause said lamp to flicker when said relay responds to failure by buzzing.

3. Electric signalling apparatus for the simultaneous suspension of parallel connected devices of continuous operation and of temporarily operating devices, comprising two electromagnetic relays, a first one of said relays having mutually opposed magnetizing windings and a spring-biased armature, normally open contact means on said armature connected across said respective windings for shorting them when said armature picks up, a current source, one of said windings being connected across said source and poled for a magnetic-force direction opposed to that of the armature spring bias, a first load circuit comprising said parallel connected devices of continuous operation and being connected in series with said other winding across said source, said other winding of said first relay having a smaller number of ampere turns than said one winding whereby said armature is normally subjected to a resultant magnetic force weaker than the spring bias, said magnetic force being larger than said spring bias when the current in said load circuit decreases to a given value below normal; said second relay having a plurality of cumulative magnetizing windings and having armature-contact means controlled by said latter windings, said first-relay armature having further contact means connecting a first one of said second-relay windings with said source whereby said second relay responds together with said first relay to produce armature oscillations for acoustic signalling, a signal lamp, said contact means of said second relay, when picked up, connecting said signal lamp with said source whereby said lamp flickers when said first relay responds, another one of said second-relay windings being connected in series with said temporarily operating devices to said source whereby said second relay responds to continuously light said lamp during operation of said latter devices.

4. On a vehicle having parallel connected tail lights, brake-pedal operated stop lights and electric direction indicator means, in combination, an apparatus for signalling to the driver the occurrence of trouble, said apparatus comprising two electromagnetic relays, a first one of said relays having mutually opposed magnetizing windings and a spring-biased armature, normally open contact means on said armature connected across said respective windings for shorting them when said armature picks up, a current source, one of said windings being connected across said source and poled for a magnetic-force direction opposed to that of the armature spring bias, a first circuit comprising said parallel connected tail lights and being connected in series with said other winding across said source, said other winding of said first relay having a smaller number of ampere turns than said one winding whereby said armature is normally subjected to a resultant magnetic force weaker than the spring bias, said magnetic force being larger than said spring bias when the current in said load circuit decreases to a given value below normal; said second relay having a plurality of cumulative magnetizing windings and having armature-contact means controlled by said latter windings, said first-relay armature having further contact means connecting a first one of said second-relay windings with said source whereby said second relay responds together with said first relay to produce armature oscillations for acoustic signalling, a signal lamp, said contact means of said second relay, when picked up, connecting said signal lamp with said source whereby said lamp flickers when said first relay responds to tail-light trouble, a second one of said second-relay windings connecting said direction-indicator means through said second-relay contact means to said source, and a third one of said second-relay windings connecting said stop lights with said source independently of said contact means, whereby actuation of said stop lights causes continuous lighting of said lamp and actuation of said direction-indicator means causes flickering only when said stop lights are inactive.

5. In apparatus according to claim 4, said second relay having a normally open armature contact connected across said second winding of said second relay, and having a normally closed armature contact connected in series with said normally open armature contact between said source and said first winding of said second relay; and said second and third windings of said second relay being series connected with each other between said source and said stop lights.

6. In apparatus according to claim 4, said third winding having a midtap, and said tail lights having two brake-pedal circuits connected respectively to said tap and to the end of said third winding remote from said second winding.

References Cited in the file of this patent

UNITED STATES PATENTS

| 1,580,313 | McIntire | Apr. 13, 1926 |
| 2,507,398 | Castra | May 9, 1950 |